D. H. Weaver
Horse Rake.

No. 103,691.

2 Sheets, Sheet 1.

Patented May 31, 1870.

Witnesses:
Milton V. Bulla
Wm Creves

Inventor:
David H. Weaver

D. H. Weaver.
Horse Rake.

No. 103,691.

2 Sheets, Sheet 2.

Patented May 31, 1870.

Witnesses
Milton V. Bulla
Wm Trees

Inventor
David H Weaver

United States Patent Office.

DAVID H. WEAVER, OF SOUTH BEND, INDIANA.

Letters Patent No. 103,691, dated May 31, 1870.

IMPROVEMENT IN HORSE HAY-RAKES.

The Schedule referred to in these Letters Patent and making part of the same.

*To whom it may concern:*

Be it known that I, DAVID H. WEAVER, of South Bend, county of St. Joseph and State of Indiana, have invented a new and useful combination of arrangements in Horse-Rakes; and I do hereby declare that the following is a full and clear description of the said invention, reference being had to the drawings annexed as part of this specification.

In the accompanying drawings—

Figure 1:
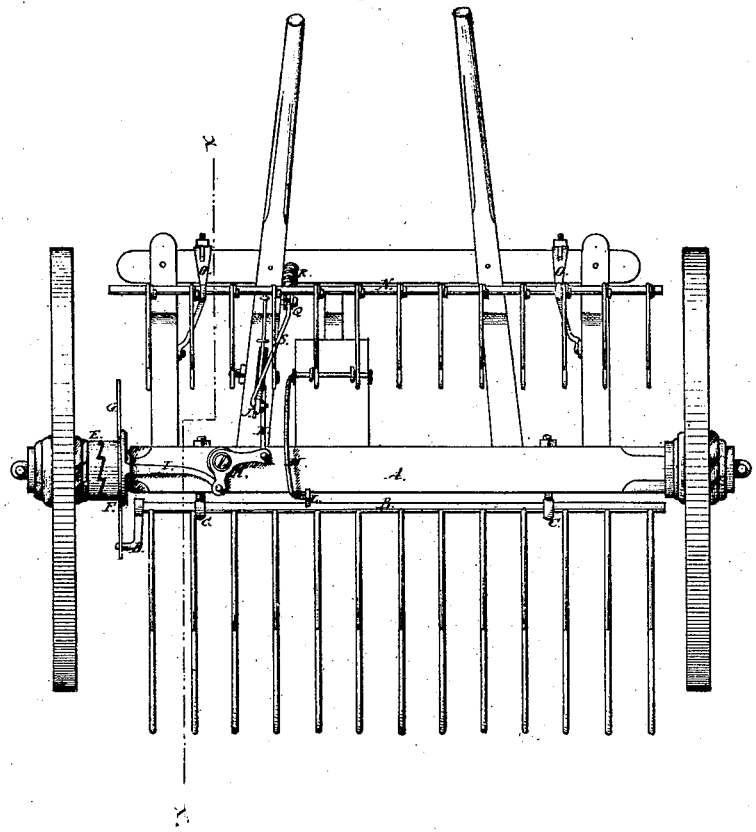
Figure 1 represents a bottom view of a horse-rake embodying that part of my invention.

In fig. 1, A represents the axle of the horse-rake.

B represents the hindmost rake-head.

C C represent the two eyes, through which passes the rake-head B, and by which the rake-head is fastened to the axle A.

D represents a crank, attached to one end of rake-head B.

E represents one of the hubs of wheel to horse-rake, the inner end of which is provided with a ratchet.

F represents a grooved loose pulley, provided with a corresponding ratchet to fit that of hub E.

G represents one of two wipers, extending in opposite directions, and fastened to pulley F.

H represents an angular lever, attached at angle to bottom of axle A.

I represents a bar, connecting with the backward extreme end of angular lever H, and extending to and fastening to groove in loose pulley F, by means of a curved bar.

J represents the lower part of a hand-lever, passing through and fastened to one of the rake-thills.

K represents a rod, connecting the other extreme end of angular lever H and lower part of hand-lever J.

N represents the head of forward rake.

Q represents a short lever, attached to rake-head N.

S represents a rod, connecting levers Q and J, and extending forward of lever Q, in order to admit of a spiral spring, as R, which gives elasticity to forward rake when in operation.

L represents a short lever, attached to rake-head B.

Figures 2, 3:
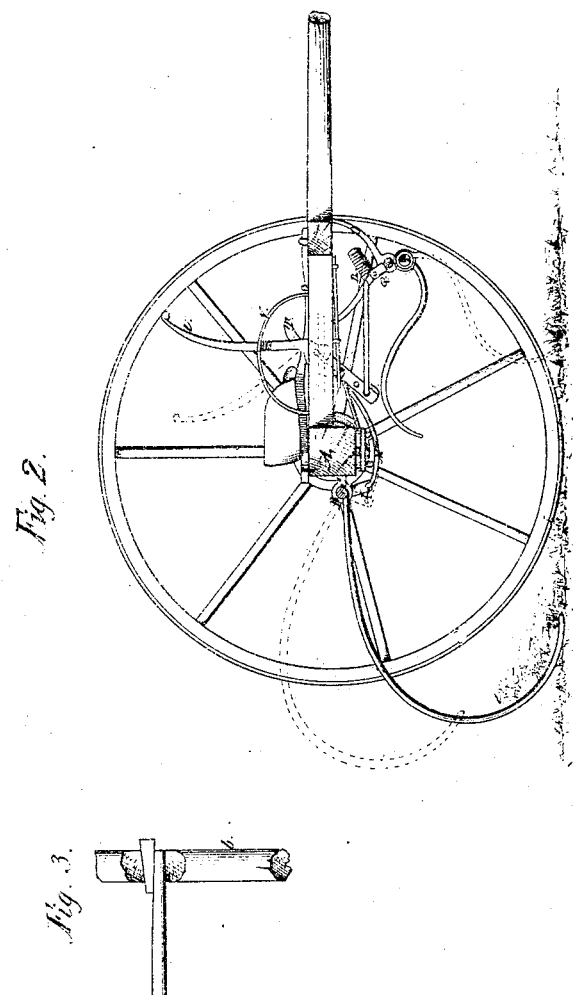
Figure 2 represents an end view of the same.
Figure 3 represents a segment of the rake-head, showing the manner of fastening the teeth.

M represents a rod, passing from lever L to foot-lever T, as shown in fig. 2.

T represents a foot-lever, by which the hindmost rake is kept in proper tension when raking.

Fig. 2 represents an end view of the same as fig. 1, excepting the top of hand-lever, as U, and foot-lever as T.

V represents a curved bar, provided with catches, so as to retain lever U either in a backward or forward position.

O O represent two hangers, made adjustable, so as to raise or lower the rake, which is fastened to these hangers.

The manner of fastening teeth to rake-head is shown by fig. 3, *b* representing a segment of rake-head, the openings for teeth being made a little elongated, so that after the tooth is put in, an iron key can be driven in, thereby securing the tooth, also easy to remove in case of replacing a new tooth.

In using this rake, the hindmost sets of teeth are used to do the general work of raking and depositing in bunches or rows, the forward sets of teeth remaining drawn up in a horizontal position until the hindmost sets of teeth are ready to be relieved of their contents, when, by moving the hand-lever U to forward catch, in curved bar V, and by means of the levers U and H, rods S, K, and D, the ratchets of hub E and loose pulley F are thrown into gear, carrying the wiper G around with the wheel, striking against the crank D, raising the hindmost teeth and discharging the contents on cleanly-raked ground.

This same forward movement of lever U not only throws into gear, but simultaneously brings into requisition the forward sets of teeth.

Immediately after the discharge of the hindmost teeth the lever U is drawn back, the ratchets thrown out of gear, and front teeth again drawn up and the hindmost teeth receive the contents of forward teeth.

What I claim as my invention, and wish to secure by Letters Patent, is—

1. The combination of clutch F, elbow-lever H, hand-lever U, rake N, and connections J, K, and S, as described.

2. The arrangement of the wipers G, attached to clutch F, an axle A, and the arm D, on rake-head B, as described.

3. The arrangement of rake N, hung in adjustable bearings O O, and having lever arm Q attached, the slotted connecting-rod S, spring R, and hand-lever J, all constructed and operating as described.

DAVID H. WEAVER.

Witnesses:
 MILTON V. BULLA,
 WM. CREUS.